US009401769B2

(12) United States Patent
Mayor et al.

(10) Patent No.: US 9,401,769 B2
(45) Date of Patent: Jul. 26, 2016

(54) METHODS FOR CALIBRATING RECEIVE SIGNAL STRENGTH DATA IN WIRELESS ELECTRONIC DEVICES

(71) Applicant: Apple Inc., Cupertino, CA (US)

(72) Inventors: Robert W. Mayor, Half Moon Bay, CA (US); Pejman Lotfali Kazemi, Sunnyvale, CA (US); Lukas M. Marti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 13/909,982

(22) Filed: Jun. 4, 2013

(65) Prior Publication Data

US 2014/0357196 A1    Dec. 4, 2014

(51) Int. Cl.
*H04B 15/00* (2006.01)
*H04B 17/00* (2015.01)
*H04B 17/21* (2015.01)
*H04B 17/318* (2015.01)

(52) U.S. Cl.
CPC ............ *H04B 17/0062* (2013.01); *H04B 17/21* (2015.01); *H04B 17/318* (2015.01)

(58) Field of Classification Search
CPC .. H04B 17/0062; H04B 17/21; H04B 17/318; H04B 12/006
USPC ......... 455/452.1, 63.1, 456.1, 456.5; 370/329
See application file for complete search history.

(56) References Cited

U.S. PATENT DOCUMENTS

| | | | | |
|---|---|---|---|---|
| 7,639,735 B1 * | 12/2009 | Dick | .................... | H04B 17/336 375/227 |
| 8,296,051 B2 * | 10/2012 | Cohen | .................. | G01C 21/206 455/13.3 |
| 8,305,106 B2 | 11/2012 | Bohn et al. | | |
| 8,391,862 B1 * | 3/2013 | Harju | ..................... | H04W 48/16 370/350 |
| 8,391,889 B2 | 3/2013 | Marti et al. | | |
| 2005/0239471 A1 * | 10/2005 | Babovic | ................ | H04B 17/21 455/452.2 |
| 2005/0243936 A1 * | 11/2005 | Agrawala | .............. | H04W 64/00 375/259 |
| 2005/0266855 A1 * | 12/2005 | Zeng | ..................... | G01S 5/0252 455/456.1 |

(Continued)

FOREIGN PATENT DOCUMENTS

| | | |
|---|---|---|
| GB | 2288711 | 10/1995 |
| WO | 2004010719 | 1/2004 |

(Continued)

*Primary Examiner* — MD Talukder
(74) *Attorney, Agent, or Firm* — Treyz Law Group, P.C.; Michael H. Lyons

(57) ABSTRACT

A wireless electronic device may include wireless communications circuitry and processing circuitry. The wireless communications circuitry may receive radio-frequency signals from external communications circuitry in a number of frequency channels of a communications band. The processing circuitry may gather received signal quality data such as receive signal strength indicator (RSSI) values from the radio-frequency signals received in each of the frequency channels. The processing circuitry may accumulate respective probability distributions of gathered RSSI values for each frequency channel and may compare each of the probability distributions to generate RSSI offset values for each frequency channel. The processing circuitry may gather additional RSSI values in one or more frequency channels and may adjust the additional RSSI values based on the associated RSSI offset values. The processing circuitry may use the adjusted RSSI values to determine an accurate location of the wireless electronic device.

18 Claims, 10 Drawing Sheets

(56) References Cited

U.S. PATENT DOCUMENTS

| | | | |
|---|---|---|---|
| 2006/0031014 A1* | 2/2006 | Sato | G01C 17/38 701/530 |
| 2008/0307025 A1 | 12/2008 | Licul | |
| 2009/0147767 A1* | 6/2009 | Lee | G01S 5/02 370/349 |
| 2009/0322492 A1* | 12/2009 | Hannah | A47F 10/04 340/10.5 |
| 2010/0007355 A1 | 1/2010 | Olgaard et al. | |
| 2010/0128689 A1* | 5/2010 | Yoon | H04B 17/318 370/329 |
| 2011/0306353 A1* | 12/2011 | Kim | H04W 48/18 455/452.2 |
| 2012/0046045 A1* | 2/2012 | Gupta | G01S 5/0252 455/456.1 |
| 2012/0315918 A1* | 12/2012 | Kadous | H04W 4/021 455/456.1 |
| 2013/0143627 A1* | 6/2013 | Rho | H04M 1/2471 455/566 |
| 2013/0165111 A1* | 6/2013 | Willins | H04W 4/027 455/432.1 |
| 2014/0357196 A1* | 12/2014 | Mayor | H04B 17/0062 455/67.11 |
| 2015/0093990 A1* | 4/2015 | Lin | H04W 4/008 455/41.2 |

FOREIGN PATENT DOCUMENTS

| | | | | |
|---|---|---|---|---|
| WO | WO 2004010719 | * | 1/2004 | H04Q 7/00 |
| WO | 2004095790 | | 11/2004 | |

* cited by examiner

METHODS FOR CALIBRATING RECEIVE SIGNAL STRENGTH DATA IN WIRELESS ELECTRONIC DEVICES

BACKGROUND

This relates generally to wireless electronic devices and, more particularly, to calibration of wireless electronic devices.

Wireless electronic devices such as portable computers and cellular telephones are often provided with wireless communications circuitry and processing circuitry. The wireless communications circuitry receives radio-frequency signals from an external communications device at a number of radio-frequencies. The processing circuitry characterizes the receive signal strength of received radio-frequency signals using a receive signal strength indicator (RSSI) metric. The processing circuitry generates RSSI data based on the received radio-frequency signals.

In conventional wireless communications devices, the processing circuitry can generate inaccurate RSSI data based on the received radio-frequency signals. Wireless electronic devices that generate inaccurate RSSI data often mischaracterize receive signal strength at certain radio-frequencies and can communicate with the external communications device using unreliable radio-frequencies.

It would therefore be desirable to be able to provide improved methods for characterizing receive signal strength using wireless electronic devices.

SUMMARY

A wireless electronic device may include wireless communications circuitry and processing circuitry. The wireless communications circuitry may include baseband circuitry, radio-frequency transceiver circuitry, radio-frequency front end circuitry, and antenna structures.

The wireless communications circuitry may receive radio-frequency signals from external communications circuitry in a number of radio-frequency channels (e.g., radio-frequency channels in a communications band such as a WiFi® band, a cellular band, a Global Positioning System band, a Bluetooth® band, etc.).

The processing circuitry may gather receive signal quality data (e.g., receive signal strength data) for radio-frequency signals received in one or more radio-frequency channels. For example, the processing circuitry may gather receive signal strength indicator (RSSI) values from the radio-frequency signals received in each radio-frequency channel.

The processing circuitry may accumulate a respective probability distribution of receive signal strength data for radio-frequency signals received in each of the radio-frequency channels. For example, the processing circuitry may accumulate a respective probability distribution of RSSI values using the RSSI values gathered from the radio-frequency signals received in each of the radio-frequency channels. The processing circuitry may compare the probability distributions to generate calibration data (e.g., a set of offset values) for the wireless electronic device. For example, the processing circuitry may determine an offset value for each of the probability distributions and may add the offset value to the gathered receive signal strength data to generate calibrated receive signal strength data. If desired, the processing circuitry may determine a location of the wireless electronic device using the calibrated receive signal strength data.

The wireless electronic device may include circuitry for monitoring an operating state of the wireless electronic device such as temperature sensor circuitry and motion sensor circuitry. The temperature sensor circuitry may gather device temperature data and the motion sensor circuitry may gather device motion data (e.g., a number of temperature values and device motion values). If desired, the processing circuitry may update the calibration data in response to detecting a change in device temperature and/or device motion.

For example, the processing circuitry may accumulate respective probability distributions of receive signal strength values obtained prior to detecting a change in device temperature and after detecting a change in device temperature (e.g., for each radio-frequency channel). The processing circuitry may accumulate respective probability distributions of receive signal strength values obtained prior to detecting a change in device motion and obtained after detecting a change in device motion. If desired, the processing circuitry may gather respective probability distributions of receive signal strength values corresponding to each measured device temperature, device motion value, and radio-frequency channel. The processing circuitry may generate receive signal strength offset values corresponding to each device motion value, device temperature, and radio-frequency channel.

Further features of the present invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in multiple wireless communications bands. The wireless communications circuitry may include multiple antennas such as loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
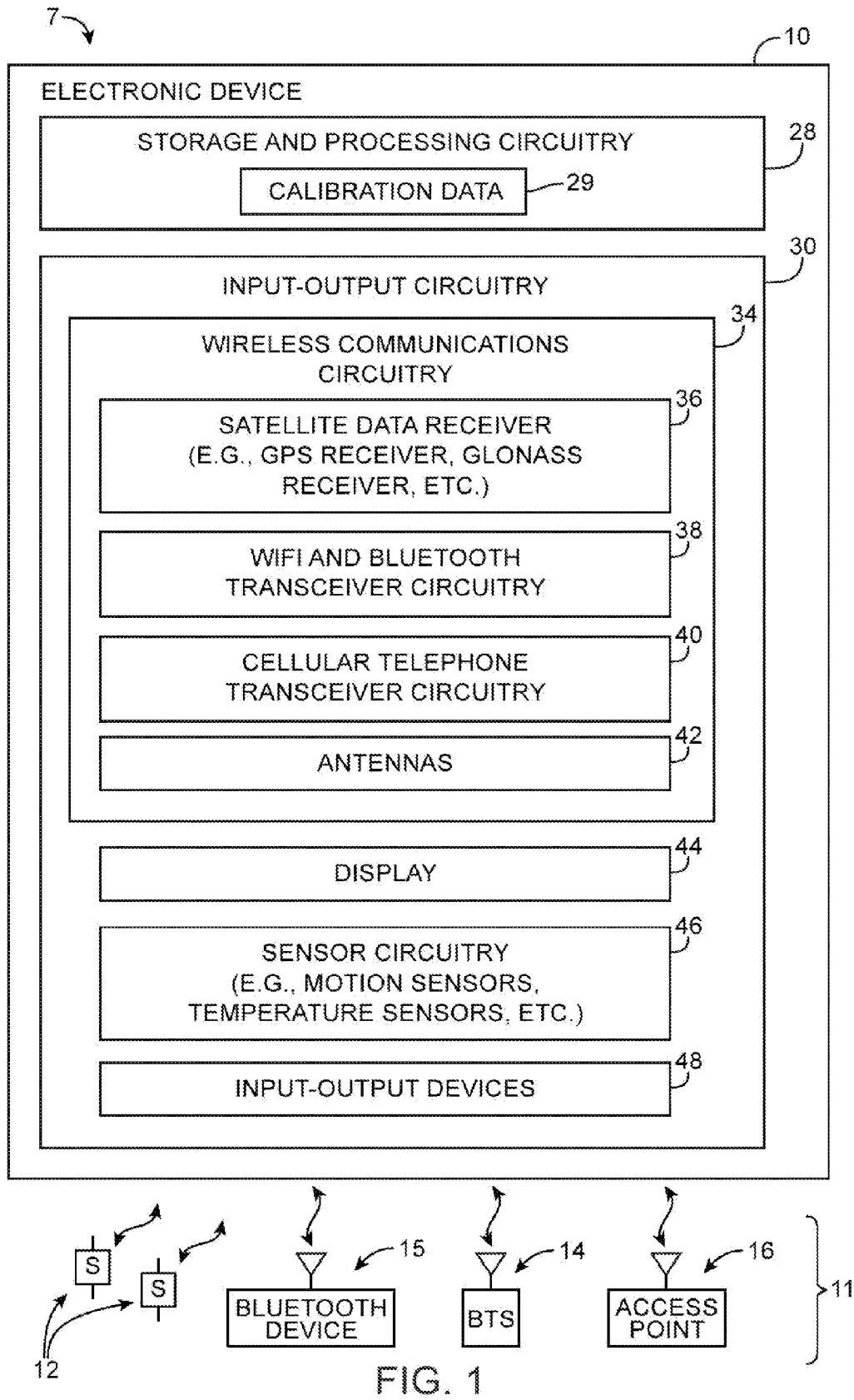
FIG. 1 is a schematic diagram of an illustrative wireless electronic device in accordance with an embodiment of the present invention.

A schematic diagram of a system in which electronic device 10 may operate is shown in FIG. 1. As shown in FIG. 1, system 7 may include wireless network equipment such as external communications devices 11. External communications devices 11 may include, for example, satellites 12, base station (or base transceiver station) 14, Bluetooth® device 15, access point 16, and other wireless network devices. Satellites 12 may include Global Positioning System (GPS) satellites and/or Global Navigation Satellite System (GLONASS) satellites. Base station 14 may be associated with a cellular telephone network, whereas access point 16 may be associated with a wireless local area network (WLAN). Bluetooth® device 15 may be associated with a Bluetooth® link. Device 10 may communicate with these network devices over respective wireless communications links.

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits may be used to control the operation of device 10. This processing circuitry (sometimes referred to herein as an applications processor) may be based on one or more microprocessors, microcontrollers, digital signal processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 14, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the Long Term Evolution (LTE) protocol, Global System for Mobile Communications (GSM) protocol, Code Division Multiple Access (CDMA) protocol, Universal Mobile Telecommunications System (UMTS) protocol, etc.

Storage and processing circuitry 28 may store calibration data such as calibration data 29. Calibration data 29 may be generated and stored on circuitry 28 during manufacture of device 10, during testing of device 10, or during normal operations of device 10 (e.g., by an end user of device 10). As examples, calibration data 29 may be used by device 10 to compensate for manufacturing variations in device 10, amplifier non-linearity, radio-frequency filter non-idealities, or other non-idealities associated with wireless communications operations performed by device 10.

Device 10 may include input-output (I/O) circuitry 30 that allows data to be conveyed between device 10 and external devices. Input-output circuit may include wireless communications circuitry 34. Storage and processing circuitry 28 may be configured to implement control algorithms that control the use of antennas in circuitry 34. In some scenarios, circuitry 28 may be used in gathering sensor signals and signals that reflect the quality of received radio-frequency signals (e.g., received paging signals, received voice call traffic, received control channel signals, received data traffic, etc.).

Storage and processing circuitry 28 may characterize the receive performance of wireless communications circuitry 34 using a radio-frequency performance metric associated with the reception of radio-frequency signals. Processing circuitry 28 may, for example, analyze wireless signals received by circuitry 34 to gather receive signal quality information such as receive signal strength data. For example, processing circuitry 28 may gather received signal strength indicator (RSSI) data (sometimes referred to as received signal strength indication data) from the received signals. RSSI data gathered by device 10 may reflect the signal power of radio-frequency signals received at wireless communications circuitry 34 from external communications devices 11. In general, a higher RSSI value is indicative of greater received radio-frequency signal power than a lower RSSI value.

Wireless communications circuitry 34 may include radio-frequency (RF) transceiver circuitry formed from one or more integrated circuits, power amplifier circuitry, low-noise input amplifiers, passive RF components, filter circuitry, switching circuitry, one or more antennas, and other circuitry for handling RF wireless signals.

Wireless communications circuitry 34 may include satellite navigation system receiver circuitry such as satellite data receiver circuitry 36. Satellite data receiver circuitry 36 may include Global Positioning System (GPS) receiver circuitry (e.g., for receiving satellite positioning signals in the GPS communications band at 1575 MHz) and/or Global Navigation Satellite System (GLONASS) receiver circuitry (e.g., for receiving satellite positioning signals in the GLONASS communications band at 1602 MHz).

Wireless communications circuitry 34 may include WiFi® and Bluetooth® transceiver circuitry 38. Transceiver circuitry 38 may sometimes be referred to as short-range transceiver circuitry 38. Short-range transceiver circuitry 38 may handle the 2.4 GHz and 5 GHz bands for WiFi® (IEEE 802.11) communications and the 2.4 GHz Bluetooth® communications band. Wireless communications circuitry 34 may use cellular telephone transceiver circuitry 40 for handling wireless communications in cellular telephone bands such as bands at 700 MHz, 850 MHz, 900 MHz, 1800 MHz, 1900 MHz, and 2100 MHz or other cellular telephone bands of interest.

Wireless communications circuitry 34 can include circuitry for other short-range and long-range wireless links if desired (e.g., WiMax circuitry, etc.). Wireless communications circuitry 34 may, for example, include, wireless circuitry for receiving radio (e.g., AM and FM radio) and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 42. Antennas 42 may be formed using any suitable types of antenna. For example, antennas 42 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. If desired, device 10 may include more than one telephone antenna. For example, there may be one cellular telephone antenna in an upper region of device 10 and another cellular telephone antenna in a lower region of device 10. Antennas 42 may be fixed or may be tunable antennas. Antennas 42 may include any desired number of antennas (e.g., one antenna, two antennas, three antennas, ten antennas, etc.).

Input-output circuitry 30 may include one or more displays such as display 44. Display 44 may be a liquid crystal display, a light-emitting diode display, an organic light-emitting diode display, an electronic ink display, a plasma display, a display that uses other display technologies, or a display that uses any two or more of these display technologies. Display 44 may include an array of touch sensors (i.e., display 44 may be a touch screen) or may be insensitive to touch. The touch sensors in a touch sensitive arrangement for display 44 may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, optical touch, etc.).

If desired, display 44 may display visual device status indicators for device 10. For example, display 44 may be used to display signal strength indicators that reflect signal power levels of radio-frequency signals received at wireless communications circuitry 34. If desired, signal strength indicators displayed using display 44 may alert a user of device 10 when there is inadequate received signal strength (e.g., an inadequate communications link with external circuitry) for proper wireless communication operations. For example, signal strength indicators displayed using display 44 may indicate that device 10 is out of range of radio-frequency signals transmitted by external communications circuitry. If desired, signal strength indicators displayed using display 44 may be based on RSSI data gathered by wireless communications circuitry 34 and storage and processing circuitry 28 (e.g., display 44 may display signal bar graphics that reflects RSSI data gathered by circuitry processing circuitry 28).

Input-output circuitry 30 may include sensor circuitry such as sensor circuitry 46. Sensor circuitry 46 may be used to characterize the operational state of device 10. For example, sensor circuitry 46 may determine environmental conditions for device 10. If desired, sensor circuitry 46 may include motion sensor circuitry (e.g., accelerometer circuitry, inertial circuitry, etc.), temperature sensor circuitry, light sensor circuitry, or any other desired sensor circuitry. Temperature sensor circuitry in sensor circuitry 46 may, for example, be used to determine internal temperatures within device 10 and/or ambient temperatures of the operating environment for device 10. Motion sensor circuitry in sensor circuitry 46 may, for example, determine the motion of device 10 by detecting forces (accelerations) applied to device 10.

Sensor circuitry 46 may provide sensor data to storage and processing circuitry 28. Sensor data provided to circuitry 28 may include, for example, temperature data gathered by temperature sensors within circuitry 46 and motion data gathered by motion sensors within circuitry 46. If desired, storage and processing circuitry 28 may process and store the sensor data as a part of calibration data 29 (e.g., so that calibration data 29 includes information about the operating conditions of device 10).

Device 10 may also include a battery, power management circuitry, and other input-output devices 48. Input-output devices 48 may include buttons, joysticks, click wheels, scrolling wheels, touch pads, key pads, keyboards, etc. A user can control the operation of device 10 by supplying commands through input-output circuitry 30 and may receive status information and other output from device 10 using the output resources of input-output circuitry 30.

Figure 2:
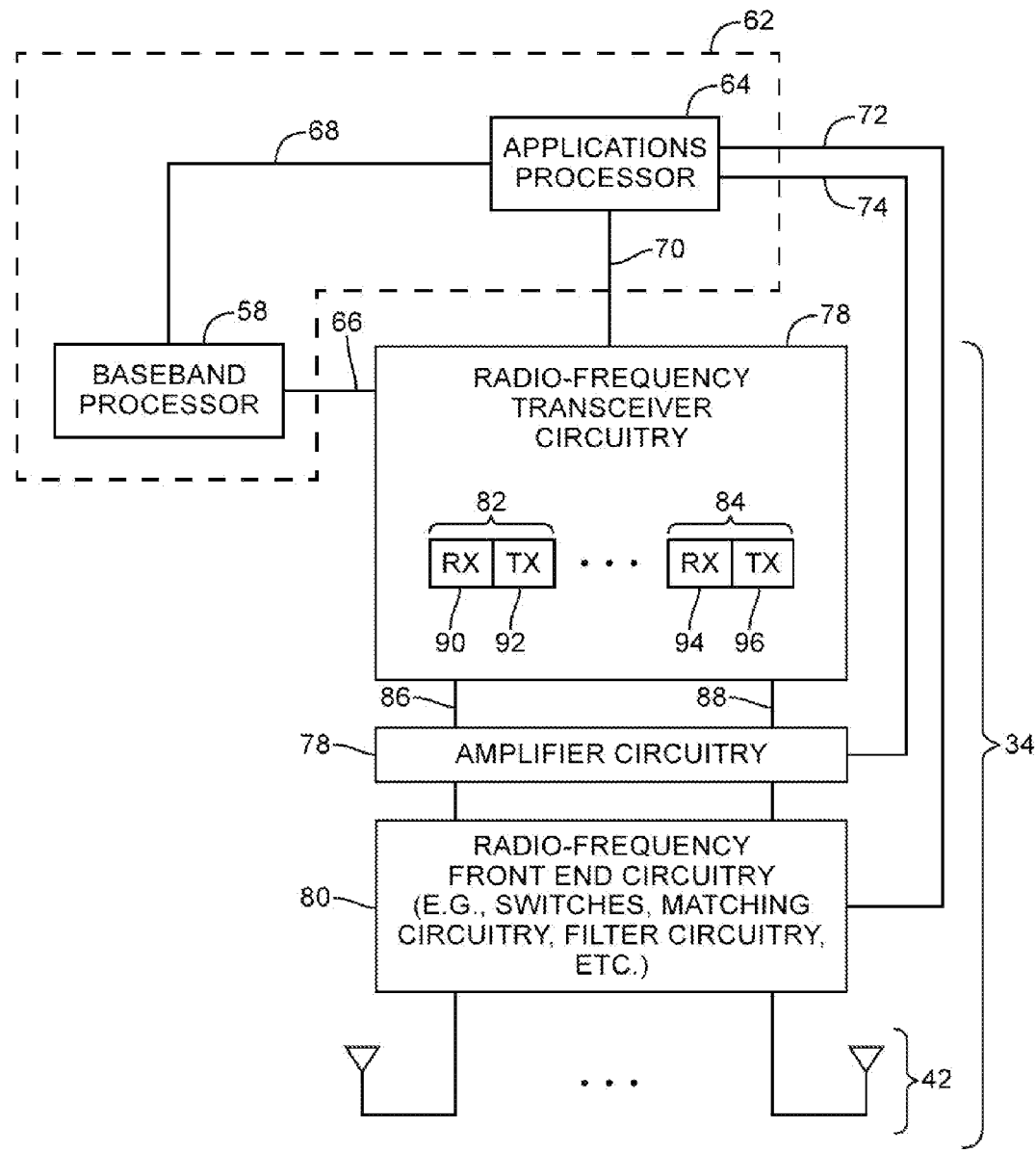
FIG. 2 is a diagram of illustrative wireless communications circuitry that may be used in an electronic device in accordance with an embodiment of the present invention.

Device 10 can be controlled by control circuitry that is configured to store and execute control code for implementing control algorithms (e.g., calibration control algorithms for generating wireless calibration data 29 and other wireless control algorithms). As shown in FIG. 2, control circuitry 62 may include applications processor 64 and may include baseband processor 58. Baseband processor 58 may form part of wireless circuitry 34 and may include memory and processing circuits (i.e., baseband processor 58 may be considered to form part of the applications processor). Applications processor 64 may form part of storage and processing circuitry 28 of FIG. 1.

Baseband processor 58 may provide data to applications processor 64 via path 68. The data on path 68 may include raw and processed data associated with wireless (antenna) performance metrics for received signals such as, frame error rate data, bit error rate data, receive signal quality data such as receive signal strength information, receive signal strength indicator (RSSI) data, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by applications processor 64 and/or processor 58 and, in response, applications processor 64 (or, if desired, baseband processor 58) may generate calibration data and/or issue control commands for controlling wireless circuitry 34. For example, applications processor 64 may issue control commands on paths 70, 72, and 74.

Applications processor 64 may generate calibration data 29 (FIG. 1) in response to receiving receive signal quality data from baseband processor 58. If desired, applications processor 64 may issue control commands for controlling wireless circuitry 34 based on calibration data 29 or may apply calibration data 29 to data received from circuitry 34. Applications processor 64 may modify RSSI data received from baseband processor 58 based on calibration data 29. For example, calibration data 29 may include RSSI offset values. If desired, RSSI offset values in calibration data 29 may be added to RSSI values received from baseband processor 58 to compensate for any erroneous RSSI values gathered by baseband processor 58 (e.g., erroneous RSSI values that were gathered as a result of manufacturing variations of device 10, etc.).

Wireless circuitry 34 may include radio-frequency transceiver circuitry such as radio-frequency transceiver circuitry 76, amplifier circuitry such as amplifier circuitry 78, and radio-frequency front-end circuitry 80. Radio-frequency transceiver circuitry 76 may include one or more radio-frequency transceivers such as transceivers 82 and 84 (e.g., one or more transceivers that are shared among antennas, one transceiver per antenna, etc.). In the illustrative configuration of FIG. 2, radio-frequency transceiver circuitry 76 has a first transceiver such as transceiver 82 that is associated with path (port) 86 and a second transceiver such as transceiver 84 that is associated with path (port) 88.

Transceiver 82 may include a transmitter such as transmitter 92 and a receiver such as receiver 90 or may contain only a receiver (e.g., receiver 90) or only a transmitter (e.g., transmitter 92). Transceiver 84 may include a transmitter such as transmitter 96 and a receiver such as receiver 94 or may contain only a receiver (e.g., receiver 94) or only a transmitter (e.g., transmitter 96). If desired, each transceiver in transceiver circuitry 76 such as transceivers 82 and 84 may be formed as a part of satellite data receiver 36, WiFi® and Bluetooth® transceiver 38, or cellular telephone transceiver 40 of FIG. 1 (e.g., a first transceiver in circuitry 76 may handle received satellite data signals, a second transceiver in circuitry 76 may handle WiFi® data signals, a third transceiver in circuitry 76 may handle Bluetooth® data signals, a fourth transceiver in circuitry 76 may handle cellular data signals, etc.).

Baseband processor 58 may receive digital data that is to be transmitted from storage and processing circuitry 28 and may use path 66 and radio-frequency transceiver circuitry 76 to transmit corresponding radio-frequency signals. Radio-frequency front end 80 may be coupled between radio-frequency transceiver 76 and antennas 42 and may be used to convey the radio-frequency signals that are produced by transmitters 92 and 96 to antennas 42. Radio-frequency front end 80 may include radio-frequency switches, impedance matching circuits, filters (e.g., low-pass filters, high-pass filters, band-pass filters, notch filters, etc.), duplexer circuitry, diplexer circuitry, and other circuitry for forming an interface between antennas 42 and radio-frequency transceiver 76.

Amplifier circuitry 78 may be interposed between radio-frequency transceiver circuitry 76 and radio-frequency front-end circuitry 80. Amplifier circuitry 78 may include power amplifier circuitry coupled between transmitters such as transmitters 92 and 96 in circuitry 76 and front-end circuitry 80. Radio-frequency signals may be amplified using amplifier circuitry 78 prior to transmission from antennas 42. Amplifier circuitry 78 may include low-noise amplifier circuitry coupled between front-end circuitry 80 and receivers such as receivers 90 and 94 in circuitry 76. Low-noise amplifier circuitry in amplifier circuitry 78 may amplify radio-frequency signals received by antennas 42 (e.g., low-noise amplifier circuitry in amplifier circuitry 78 may apply a gain to received wireless signals).

Incoming radio-frequency signals that are received by antennas 42 may be provided to baseband processor 58 via radio-frequency front end 80, amplifier circuitry 78, paths such as paths 86 and 88, and receiver circuitry in radio-frequency transceiver 76 such as receiver 90 at port 86 and receiver 94 at port 88. Baseband processor 58 may convert these received signals into digital data that is provided to applications processor 64.

Baseband processor 58 may extract information from received signals that is indicative of signal quality for the radio-frequency channel in which the transceiver is currently tuned (e.g., baseband processor 58 may gather receive signal strength values from received radio-frequency signals). For example, baseband processor 58 and/or other circuitry in control circuitry 62 may gather RSSI values from radio-frequency signals received by antennas 42.

RSSI data gathered by circuitry 62 may be indicative of the signal power level of radio-frequency signals received at communications circuitry 34. RSSI data gathered by baseband processor 58 may be stored on storage and processing circuitry 28. If desired, storage and processing circuitry 28 may use the gathered RSSI data to estimate the distance between device 10 and the external circuitry 11 that transmitted the radio-frequency signals from which the RSSI data was gathered.

As an example, processing circuitry 28 may estimate the distance between device 10 and a WLAN access point such as access point 16 of FIG. 1. In this example, access point 16 transmits radio-frequency signals to device 10 at an output power level. The signal power level of the radio-frequency signals when received by wireless communications circuitry 34 may be less than the output power level with which access point 16 transmitted the signals. In general, the signal power level of radio-frequency signals received by device 10 depends on the distance between device 10 and access point 16. For example, the signal power level of radio-frequency signals received by device 10 may be inversely proportional to the distance between device 10 and access point 16 (e.g., signal power level of received radio-frequency signals may be greater for access points that are closer to device 10 than for access points that are farther from device 10).

RSSI values gathered by control circuitry 62 may vary with respect to the distance between device 10 and access point 16. For example, circuitry 62 may gather a lower RSSI value for signals received from access point 16 when device 10 is far from access point 16 and may gather a greater RSSI value when device 10 is near to access point 16 (assuming the signals are transmitted by access point 16 in the same radio-frequency channel and at the same output power level). Storage and processing circuitry 28 may estimate the distance between device 10 and access point 16 based on the gathered RSSI data. For example, storage and processing circuitry 28 may estimate the distance to access point 16 based on a known (predetermined) correlation between RSSI and transmitter distance.

This example is merely illustrative. If desired, control circuitry 62 may gather RSSI data for radio-frequency signals received from cellular base station 14 to estimate the distance between device 10 and base station 14, may gather RSSI data for radio-frequency signals received from Bluetooth® device 15 to estimate the distance between device 10 and Bluetooth® device 15, and may gather RSSI data for radio-frequency signals received from satellites 12 to estimate the distance between device 10 and satellites 12.

Figure 3:
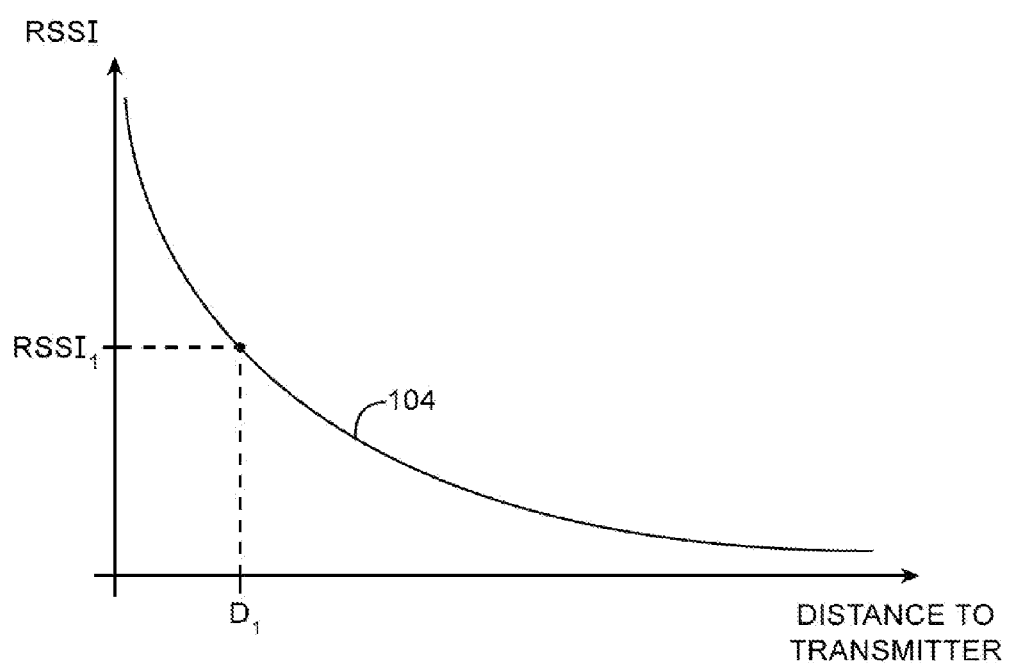
FIG. 3 is a graph showing how received signal strength indicator (RSSI) values gathered by a wireless electronic device from radio-frequency signals received from external communications circuitry may vary as a function of the distance between the wireless electronic device and the external communications circuitry in accordance with an embodiment of the present invention.

FIG. 3 is an illustrative plot showing how RSSI values gathered by control circuitry 62 may be correlated with distance from device 10 to external device 11. As shown in FIG. 3, curve 104 illustrates how RSSI values gathered by control circuitry 62 may vary with respect to distance from external device 11. As distance between external device 11 and device 10 increases, signal power levels of radio-frequency signals received at wireless communications circuitry 34 and the corresponding RSSI values gathered by control circuitry 62 decrease.

Curve 104 may represent a known correlation between RSSI values and distance to external device 11. Curve 104 may be predetermined or may be computed through testing of device 10 (e.g., curve 10 may be determined through modeling, mathematical analysis, testing and calibration of device 10 at known distances to external device 11, etc.). Storage and processing circuitry 28 may extract distance information from gathered RSSI values using a correlation such as correlation 104. In the example of FIG. 3, control circuitry 62 may gather an RSSI value $RSSI_1$ from radio-frequency signals received from external circuitry 11. Storage and processing circuitry 28 may identify a distance $D_1$ associated with RSSI value $RSSI_1$ using curve 104. Distance $D_1$ may be used by processing circuitry 28 as an estimate of the distance between device 10 and external device 11.

In the example of FIG. 3, curve 104 illustrates an exponential correlation between gathered RSSI values and the distance to external device 11 (e.g., RSSI values may exponentially decrease as distance between device 10 and external device 11 increases). This example is merely illustrative. The correlation between RSSI values and distance to external device 11 may follow any trend (e.g., curve 104 may be linear, may be logarithmic, may be quadratic, may depend on objects between device 10 and external device 11, etc.).

If desired, device 10 may receive radio-frequency signals from multiple external communications devices. Control circuitry 62 may gather RSSI data for radio-frequency signals received from each external device 11 and may estimate the distance between device 10 and each external device 11 using the gathered RSSI data. Control circuitry 62 may combine the estimated distances to determine a geographical location of device 10 (e.g., control circuitry 62 may triangulate the position of device 10 relative to external devices 11 based on the estimated distances).

Wireless communications circuitry 34 may receive radio-frequency signals from external devices 11 in one or more radio-frequency channels (sometimes referred to herein as frequency channels) of a communications band such as a WiFi® communications band, a cellular band, a Bluetooth® band, a GPS band, etc. During radio-frequency signal reception, filtering circuitry in radio-frequency front end 80 may be used to isolate radio-frequency signals that are transmitted and received in different communications bands (e.g., to prevent interference or leakage of signals between communications bands). Filtering circuitry in front end 80 may be subject to non-idealities such as improper filter roll-off, in which signals received at frequencies near the edges of a given communications band are attenuated more than signals received at frequencies near the center of the communications band.

Non-idealities such as improper filter roll-off by front end circuitry 80 may cause baseband processor 58 to receive radio-frequency signals at higher signal power levels for some frequency channels than for other frequency channels. For example, radio-frequency signals may be received at antennas 42 with a given signal power level for all frequency channels in a given communications band. When the signals are received by baseband processing circuitry 58 (e.g., after passing through front end 80, amplifier circuitry 78, and transceiver circuitry 76), the signals may have the given signal power level for frequency channels at the center of the communications band and may have a reduced signal power level that is less than the given signal power level for frequency channels at the edges of the communications band. In other words, signals that are received at baseband processing circuitry 58 may have different levels of gain based on frequency of the signals. This difference in signal power level as a function of signal frequency for signals received at baseband processor 58 may sometimes be referred to herein as a channel-to-channel gain bias or a non-uniform gain bias.

Channel-to-channel gain bias may cause baseband processor 58 to gather erroneously low RSSI values (e.g., RSSI values that are lower than RSSI values that would be gathered if no channel-to-channel gain bias were present) from radio-frequency signals received in some frequency channels of the communications band. For example, baseband processor 58 may gather erroneously low RSSI values from received signals even when the signals were transmitted by an external device 11 at the same signal power level in all frequency channels and at a fixed distance to device 10.

When estimating the distance between device 10 and external device 11, storage and processing circuitry 28 may estimate an erroneous distance to external device 10 if RSSI values in certain channels are used (e.g., if erroneously low RSSI values are used). Erroneous distance estimations may, for example, cause device 10 to determine an inaccurate geographical location of device 10.

Figure 4:
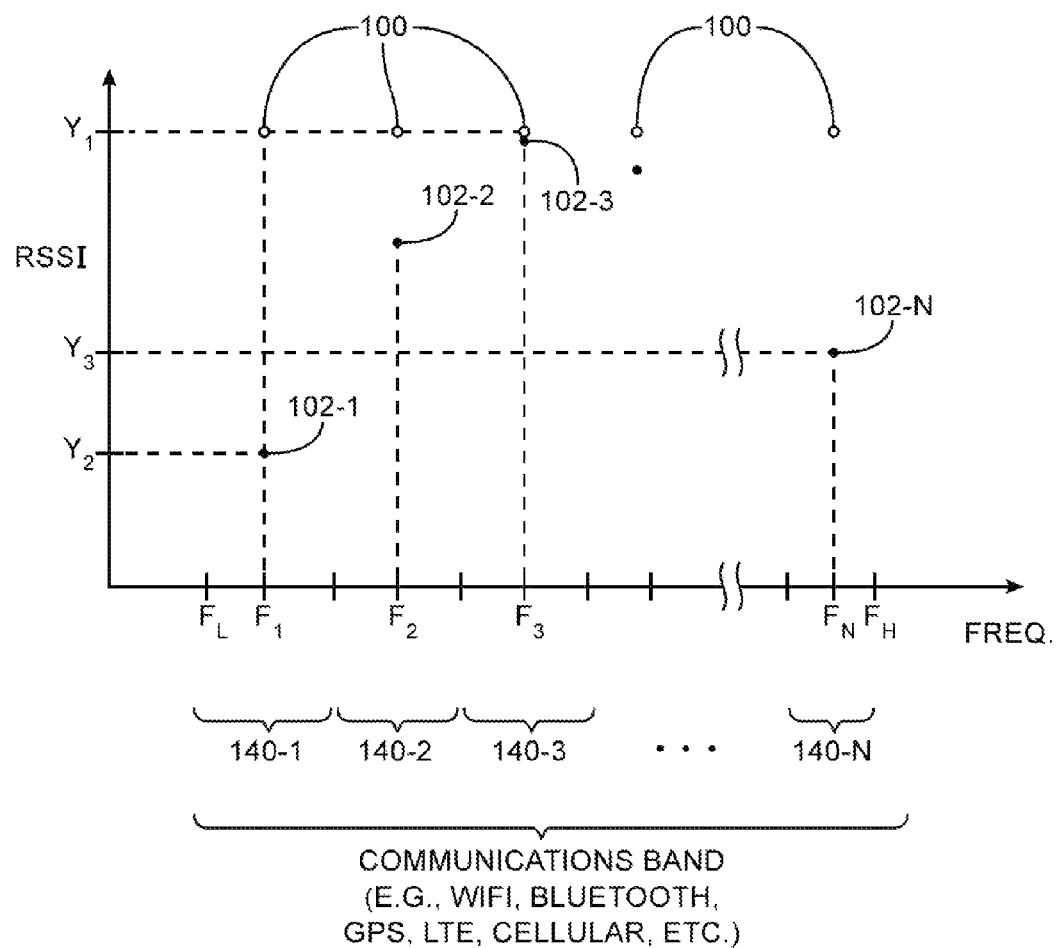
FIG. 4 is a graph showing how erroneously low RSSI data may be gathered by a wireless electronic device from radio-frequency signals received in radio-frequency channels at the edges of a communications band in accordance with an embodiment of the present invention.

FIG. 4 is an illustrative plot showing how erroneously low RSSI values may be gathered by control circuitry 62 for signals received from external device 11 in frequency channels at the edge of a communications band. As shown by FIG. 4, device 10 may receive radio-frequency signals from an external device 11 (e.g., an external device 11 at a fixed distance to device 10). Wireless communications circuitry 34 may receive the radio-frequency signals in a communications band between frequencies $F_L$ and $F_H$. The communications band between frequencies $F_L$ and $F_H$ may, for example, be a WiFi® communications band, a Bluetooth® communications band, a cellular communications band, a satellite communications band (e.g., a GPS or GLONASS communications band), or any other desired communications band associated with radio-frequency communications between device 10 and external device 11.

The communications band between frequencies $F_L$ and $F_H$ may be partitioned into a number of frequency channels 140. For example, the communications band may include a first frequency channel 140-1 centered at frequency F1, a second frequency channel 140-2 centered at frequency F2, a third frequency channel 140-3 centered at frequency F3, an Nth frequency channel centered at frequency FN, etc. In another suitable arrangement, the communications band between frequencies $F_L$ and $F_H$ may include a continuous range of frequencies between frequencies $F_L$ and $F_H$.

Control circuitry 62 on device 10 may gather RSSI values from the received signals. As shown in FIG. 4, points 100 illustrate RSSI data gathered by a device without channel-to-channel gain bias (e.g., gathered by a device having ideal filtering circuitry in front end circuitry 80). When no channel-to-channel gain bias is present, the device may gather an RSSI value $Y_1$ for radio-frequency signals received in each frequency channel 140.

As shown in FIG. 4, points 102 illustrate RSSI data gathered by a device 10 having channel-to-channel gain bias (e.g., gathered by a device having non-idealities in front end circuitry 80). When channel-to-channel gain bias is present, control circuitry 62 may gather different RSSI values for each frequency channel 140. For example, circuitry 62 may gather an erroneously low RSSI value $Y_2$ in frequency channel 140-1 (e.g., as shown by point 102-1) and an erroneously low RSSI value $Y_3$ in frequency channel 140-N (e.g., as shown by point 102-N). Erroneously low RSSI values $Y_2$ and $Y_3$ may cause storage and processing circuitry 28 to incorrectly characterize the receive signal strength (e.g., communication link quality) of radio-frequency signals that are received in frequency channels 140-1 and 140-N.

Circuitry 62 may gather an RSSI value $Y_1$ in frequency channel 140-3 (e.g., as shown by point 102-3). In this example, the RSSI value in frequency channel 140-3 is the same regardless of whether or not there is channel-to-channel gain bias in wireless communications circuitry 34 (e.g., filter roll-off in front end 80 may have a negligible effect on radio-frequency signals received at frequencies near the center of the communications band).

Processing circuitry 28 may use RSSI values such as RSSI value $Y_1$ gathered in frequency channel 140-3, RSSI value $Y_2$ gathered in frequency channel 140-1, and/or RSSI value $Y_3$ gathered in frequency channel 140-N to determine the distance between device 10 and external device 11. If processing circuitry 28 estimates the distance to external device 11 using RSSI in channel 140-1 or RSSI in channel 140-N, processing circuitry 28 may determine that external device 11 is farther away from device 10 than if distance is estimated using RSSI in channel 140-3 (e.g., because erroneously low RSSI values $Y_2$ and $Y_3$ may be characteristic of signals received from an external device that is farther away from device 10 than the actual distance between device 10 and external device 11).

This channel-to-channel gain bias may, for example, cause device 10 to incorrectly determine the geographical location of device 10 and may cause device 10 to incorrectly characterize the signal strength of received radio-frequency signals (e.g., display 44 may display incorrect graphical signal strength bars). It may therefore be desirable to be able to provide device 10 with improved processing circuitry for gathering accurate RSSI data from radio-frequency signals received at different frequencies.

Figure 5:
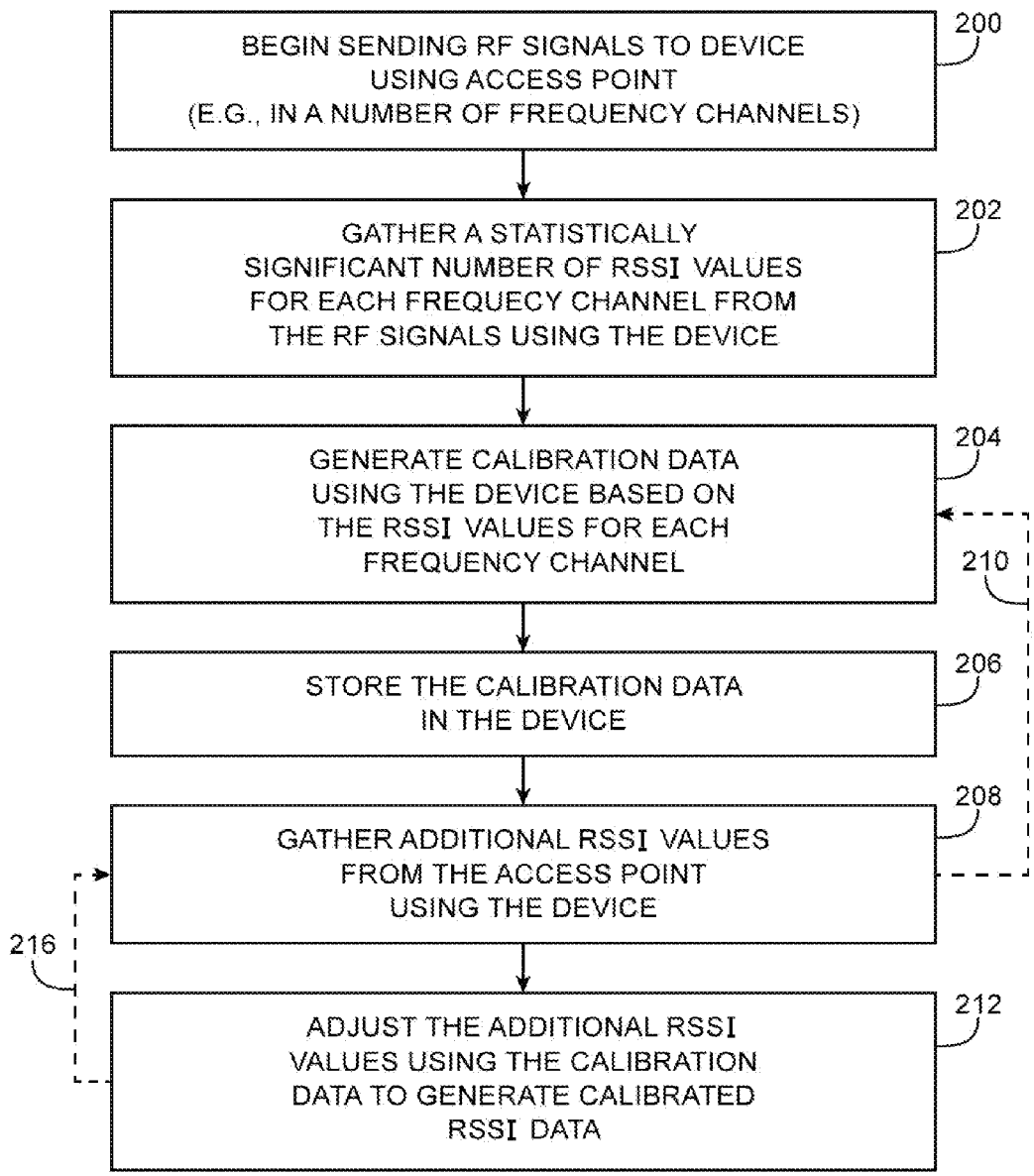
FIG. 5 is a flow chart of illustrative steps that may be performed by a wireless electronic device and external communications circuitry for generating calibrated RSSI values in accordance with an embodiment of the present invention.

FIG. 5 shows a flow chart of illustrative steps that may be performed by device 10 and an external communications device such as access point 16 for gathering accurate RSSI data from radio-frequency signals received by device 10 in different frequency channels.

At step 200, access point 16 may begin transmitting radio-frequency signals to device 10. Access point 16 may transmit radio-frequency signals in a communications band such as the communications band between frequencies $F_L$ and $F_H$ of FIG. 4 (e.g., a WiFi® communications band). Access point 16 may transmit radio-frequency signals to device 10 in a number of frequency channels such as frequency channels 140. If desired, access point 16 may transmit signals to device 10 in one or more frequency channels 140 simultaneously, may transmit signals in all frequency channels 140 simultaneously, may transmit signals in each frequency channel 140 in serial (e.g., access point 16 may perform a frequency scan of transmitted signals), may transmit signals in multiple frequency channels 140 in serial, etc.

If desired, access point 16 may periodically perform so-called "location runs" on device 10. During a location run, access point 16 may periodically transmit radio-frequency signals to device 10 in different frequency channels. Location runs performed with device 10 may include, for example, automatically transmitting and receiving geographical location information and time stamp information for device 10 during normal operation of device (e.g., location runs may be performed as a background process on device 10 without active input from a user of device 10 and/or without notifying a user of device 10).

At step 202, device 10 may gather RSSI data from external device 11 until a statistically significant number of RSSI values has been gathered from radio-frequency signals received in each frequency channel of the communications band. For example, device 10 may gather one-hundred RSSI values for each frequency channel, one-thousand RSSI values for each frequency channel, ten-thousand RSSI values for each frequency channel, etc. If desired, processing circuitry 28 may accumulate probability distributions of RSSI values (e.g., histograms of RSSI values, probability density functions of RSSI values, etc.) gathered from radio-frequency signals received in each frequency channel. Processing circuitry 28 may, for example, gather a respective probability distribution of RSSI values for each frequency channel.

Processing circuitry 28 may determine when a statistically significant number of RSSI values have been gathered based on the generated probability distributions of RSSI values. For example, processing circuitry 28 may gather a set of statistics (e.g., a mean value, variance value, standard deviation, range, median value, etc.) associated with each generated probability distribution (e.g., circuitry 28 may gather a respective set of statistics associated with radio-frequency signals received in each frequency channel). Processing circuitry 28 may use the set of statistics for each probability distribution to determine whether device 10 has gathered a statistically significant number of RSSI values for each frequency channel.

At step 204, processing circuitry 28 may generate calibration data 29 for wireless communications circuitry 34. Calibration circuitry 29 may be computed based on the RSSI data gathered from the radio-frequency signals received in each frequency channel. For example, processing circuitry 28 may compare accumulated probability distributions of RSSI values generated for each frequency channel to generate respective RSSI offset values for each frequency channel (e.g., circuitry 28 may generate a first offset value for RSSI values associated with first channel 140-1, a second offset value for RSSI values associated with second channel 140-2, etc.). If desired, processing circuitry 28 may generate calibration data 29 (e.g., offset values) based on the set of statistics associated with the probability distribution of RSSI values for each frequency channel.

At step 206, storage and processing circuitry 28 may store calibration data 29 for use during subsequent communications operations using device 10.

At step 208, circuitry 62 may gather additional RSSI values from radio-frequency signals received from access point 16. For example, control circuitry 62 may gather additional RSSI values from radio-frequency signals in each frequency channel, in one frequency channel, in a subset of frequency channels in the associated communications band, etc.

If desired, processing may optionally loop back to step 204 (as shown by path 210) to update calibration data 29 using the additional gathered RSSI values. For example, storage and processing circuitry 28 may re-compute calibration data 29 based on the additional RSSI values (e.g., processing circuitry 28 may update the probability distribution of RSSI values in each frequency channel using the additional RSSI values, may update the set of statistics associated with each probability distribution, and may generate calibration data using the updated probability distributions of RSSI values).

At step 212, processing circuitry 28 may modify the additional RSSI values based on calibration data 29. The calibration data may adjust the additional RSSI values to compensate for any erroneous RSSI values that are gathered (e.g., to account for channel-to-channel gain bias generated by wireless communications circuitry 34). If desired, processing circuitry 28 may add offset values in calibration data 29 to the additional RSSI values. For example, processing circuitry 28 may add a first offset value associated with a first frequency channel (e.g., frequency channel 140-1) to additional RSSI values that were gathered for signals received in the first frequency channel, processing circuitry 28 may add a second offset value associated with a second frequency channel to additional RSSI values that were gathered for the second frequency channel, etc. If desired, the RSSI values that are adjusted using the calibration data may be passed to other processing circuitry in device 10. Storage and processing circuitry 28 may use the adjusted (calibrated) RSSI data to determine accurate distances between device 10 and external devices 11, to determine accurate received signal strengths, etc. As an example, the calibrated RSSI data may be illustrated by points 100 of FIG. 4.

If desired, processing may optionally loop back to step 208 (as shown by path 216) to gather additional RSSI values from radio-frequency signals received by wireless communications circuitry 34. The example of FIG. 5 is merely illustrative. If desired, any external device 11 may send radio-frequency signals to device 10 (e.g., Bluetooth® device 15, base station 14, satellites 12, etc.). Storage and processing circuitry 28 may gather calibrated RSSI data for signals received from any external device 11 such as Bluetooth® device 15, base station 14, satellites 12, or combinations of these external devices.

Figure 6:
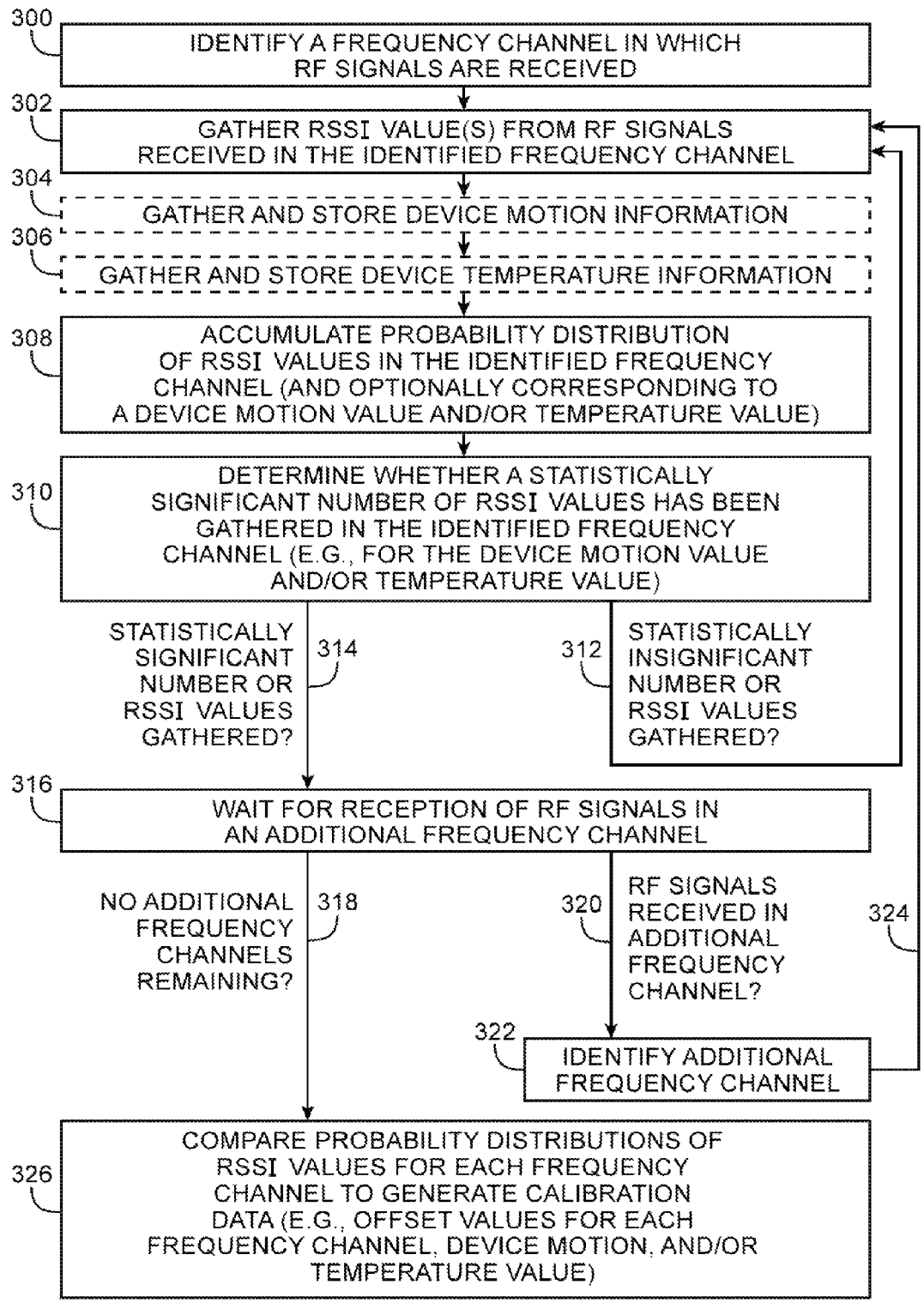
FIG. 6 is a flow chart of illustrative steps that may be performed by a wireless electronic device to generate calibrated RSSI values corresponding to different radio-frequency channels, device motion conditions, and device temperature conditions in accordance with an embodiment of the present invention.

FIG. 6 shows a flow chart of illustrative steps that may be performed by a wireless electronic device such as device 10 for generating calibration data such as calibration data 29. The steps of FIG. 6 may, for example, be performed by device 10 while processing steps 202 and 204 of FIG. 5. Device 10 may receive radio-frequency signals in a communications band from an external radio-frequency communications source such as external device 11.

At step 300, control circuitry 62 may identify a frequency channel in which radio-frequency signals are being received from external device 11. For example, circuitry 62 may identify that wireless communications circuitry 34 is receiving radio-frequency signals in frequency channel 140-1 (FIG. 4) from external device 11.

At step 302, control circuitry 62 may gather an RSSI value from the radio-frequency signals received in the identified frequency channel. If desired, control circuitry 62 may gather multiple RSSI values from the radio-frequency signals received in the identified channel (e.g., circuitry 62 may gather one RSSI value, two RSSI values, ten RSSI values, etc.). The gathered RSSI value may be stored in storage and processing circuitry 28 for subsequent processing.

During normal operation of device 10, temperature and motion of device 10 may affect the RSSI values that are gathered from received radio-frequency signals At optional step 304, sensor circuitry 46 on device 10 (see, e.g., FIG. 1) may gather device motion information. For example, sensor circuitry 46 may gather a motion value associated with each gathered RSSI value (e.g., the motion value may be indicative of the motion of device 10 while the associated RSSI value was being gathered). The motion value may include acceleration information, force information, velocity information, or any other desired information about the motion of device 10. Device motion information gathered by sensor circuitry 46 may be passed to storage and processing circuitry 28. Storage and processing circuitry 28 may store the motion information for subsequent processing.

If desired, circuitry 28 may require a particular amount of device motion while gathering RSSI values. In some scenarios, device 10 may be subject to multipath fading effects that contribute to channel-to-channel gain bias for signals received by baseband processor 58. As an example, when RSSI values are gathered over relatively short time periods, multipath fading effects may contribute to gain bias more than non-idealities in front end circuitry 80. Circuitry 28 may require device 10 to gather RSSI values over relatively long periods of time and for many device motion values to mitigate the effects of multipath fading on received signals (e.g., to allow multipath fading effects to average out across each frequency channel, thereby reducing channel-to-channel gain bias). If desired, circuitry 28 may discard RSSI values obtained while device 10 is stationary, may require control circuitry 62 to gather RSSI values only while device 10 is in motion, etc.

At optional step 306, sensor circuitry 46 may gather device temperature information. For example, sensor circuitry 46 may gather a temperature value associated with each gathered RSSI value (e.g., the temperature value may be indicative of the temperature of device 10 while the associated RSSI value was being gathered). The temperature information may include external device temperature values (e.g., temperature values of the environment in which device 10 is located) and/or internal device temperature values. Device temperature information gathered by sensor circuitry 46 may be passed to storage and processing circuitry 28. Storage and processing circuitry 28 may store the temperature information for subsequent processing.

If desired, storage and processing circuitry 28 may track changes in device temperature (e.g., as measured by circuitry 46) using a state based estimation technique such as a Kalman Filter. For example, circuitry 28 may generate a differential RSSI value between two RSSI values gathered from signals in two different frequency channels. Circuitry 28 may track the differential RSSI value over time and may average tracked differential RSSI values after a relatively long time period to estimate the gain bias between the two corresponding frequency channels. If desired, one of the two frequency channels may be selected as a reference channel and all subsequently measured RSSI values may be corrected based on RSSI values gathered for the reference channel.

If desired, control circuitry 62 may identify timestamp information associated with each gathered RSSI value, device motion value, and device temperature value. For example, a particular gathered RSSI value, motion value, and temperature value may be associated with a particular timestamp value (e.g., a timestamp value indicative of the time at which the associated RSSI value, motion value, and/or temperature value was gathered).

At step 308, storage and processing circuitry 28 may accumulate a probability distribution using the gathered RSSI value. The accumulated probability distribution may be a probability distribution of RSSI values for the identified frequency channel. In scenarios where motion information is gathered, the accumulated probability distribution may be a probability distribution of RSSI values for the identified frequency channel and motion value. For example, circuitry 28 may accumulate a respective probability distribution of RSSI values for each motion value that is gathered.

In scenarios where temperature information is gathered, the accumulated probability distribution may be a probability distribution of RSSI values for the identified frequency channel using the gathered RSSI values for the identified frequency channel. For example, circuitry 28 may accumulate a respective probability distribution of RSSI values for each temperature value that is gathered. In scenarios where temperature information and motion information are gathered, circuitry 28 may accumulate a respective probability distribution of RSSI values for frequency channel, temperature and motion value that is gathered.

As examples, processing circuitry 28 may accumulate a first probability distribution of RSSI values associated with the identified channel for a first motion value and a first temperature value, may accumulate a second probability distribution of RSSI values for a second motion value and the first temperature value, may accumulate a third probability distribution of RSSI values for a second temperature value and the first motion value, may accumulate a fourth probability distribution of RSSI values for the second temperature value and second motion value, etc.

At step 310, storage and processing circuitry 28 may determine whether a statistically significant number of RSSI values has been gathered in the identified frequency channel. For example, storage and processing circuitry 28 may identify a set of statistics associated with the accumulated probability distribution and may determine whether a statistically significant number of RSSI values has been gathered based on the set of statistics.

In one suitable arrangement, processing circuitry 28 may determine that a statistically significant number of RSSI values has been gathered once a given number of RSSI values have been gathered for multiple non-zero motion values (e.g., for each motion value measured by sensor circuitry 46). For example, circuitry 28 may require each accumulated probability distribution to be associated with non-zero device motion values (e.g., circuitry 28 may require all accumulated RSSI values to be gathered while device 10 is in motion). In this way, circuitry 28 may mitigate multipath fading effects for the accumulated probability distributions of RSSI values. In another suitable arrangement, circuitry 28 may determine that a statistically significant number of RSSI values has been gathered after a selected time duration (e.g., after a selected time period that is long enough to mitigate the effects of multipath fading on the accumulated probability distributions).

In scenarios where motion information and temperature information are gathered, processing circuitry 28 may process the accumulated probability distribution of RSSI values for a particular motion value and temperature value to determine whether a statistically significant number of RSSI values have been gathered for the identified frequency channel, temperature value, and motion value. If a statistically insignificant number of RSSI values has been gathered for the identified frequency channel (and optionally for the associated motion value and/or temperature value), processing may loop back to step 302 (as shown by path 312) to gather additional RSSI values from the RF signals received in the identified frequency channel.

If a statistically significant number of RSSI values has been gathered for the identified frequency channel (and optionally for the associated motion value and/or temperature value), processing may proceed to step 316 (as shown by path 314). At step 314, device 10 may wait for reception of radio-frequency signals in an additional frequency channel. For example, device 10 may wait to receive radio-frequency signals from external device 11 in an additional frequency channel 140 of the communications band.

If radio-frequency signals are received in an additional frequency channel (e.g., a channel for which RSSI values have not yet been gathered), processing may proceed to step 322 (as shown by path 320). At step 322, control circuitry 62 may identify the additional frequency channel in which the radio-frequency signals are received. For example, control circuitry 62 may identify that wireless communications circuitry 34 is receiving radio-frequency signals in frequency channel 140-2. Processing may subsequently loop back to step 302 (as shown by path 324) to gather RSSI values in the additional frequency channel.

If no frequency channels remain for gathering RSSI values, processing may proceed to step 326 (as shown by path 318). For example, processing may proceed to step 320 when a statistically significant number of RSSI values have been gathered for each frequency channel in the communications band, for each motion value, for each temperature value, or for each combination of frequency channel, motion value, and temperature value.

At step 326, storage and processing circuitry 28 may compare the probability distributions of RSSI values for each frequency channel to obtain calibration data such as calibration data 29. For example, circuitry 28 may compare the sets of statistics associated with the probability distribution for each frequency channel to generate a set of RSSI offset values. If desired, circuitry 28 may generate a respective set of RSSI offset values for each motion value and/or temperature value gathered by sensor circuitry 46. For example, circuitry 28 may generate a first set of offset values (e.g., a set of respective offset values for each frequency channel) associated with a first motion value, a second set of offset values associated with a first temperature value, a third set of offset values associated with a second motion value and a second temperature value, etc. Offset values generated by circuitry 28 may be applied to subsequently gathered RSSI values to generate calibrated RSSI values at each frequency and for each motion value and/or temperature value.

By generating respective offset values for each motion value and temperature value that was measured by sensor circuitry 46, control circuitry 62 may ensure that RSSI offset values are gathered for a range of different operating conditions of device 10. In this way, calibrated RSSI values may be generated from radio-frequency signals in each frequency channel regardless of the motion and/or temperature conditions of device 10 (e.g., regardless of the operating state of device 10). If desired, processing circuitry 28 may update calibration data 29 if additional motion values and/or temperature values are gathered by sensor circuitry 46 (e.g., so that a respective offset values are computed for each frequency channel, temperature value, and/or motion value).

If desired, the processing circuitry 28 may detect a change in the operating state of device 10 using motion and temperature values gathered by sensor circuitry 46. For example, processing circuitry 28 may accumulate a first probability distribution of RSSI values that were gathered prior to detecting a change in device motion or temperature and may accumulate a second probability distribution of RSSI values that were gathered after detecting the change in device motion or temperature. In this way, probability distributions of RSSI values corresponding to each gathered temperature and motion value may be accumulated.

The example of FIG. 6 is merely illustrative. In another suitable arrangement, storage and processing circuitry 28 may accumulate a probability distribution of RSSI values for each frequency channel whenever radio-frequency signals are received for that frequency channel. For example, control circuitry 62 may gather RSSI data for a given frequency channel and may subsequently gather RSSI data for an additional frequency channel before a statistically significant number of RSSI values has been gathered for the given frequency channel. In this way, processing circuitry 28 may opportunistically accumulate probability distributions for each frequency channel based on the frequency channel of the radio-frequency signals that are received from external device 11.

Figure 7:
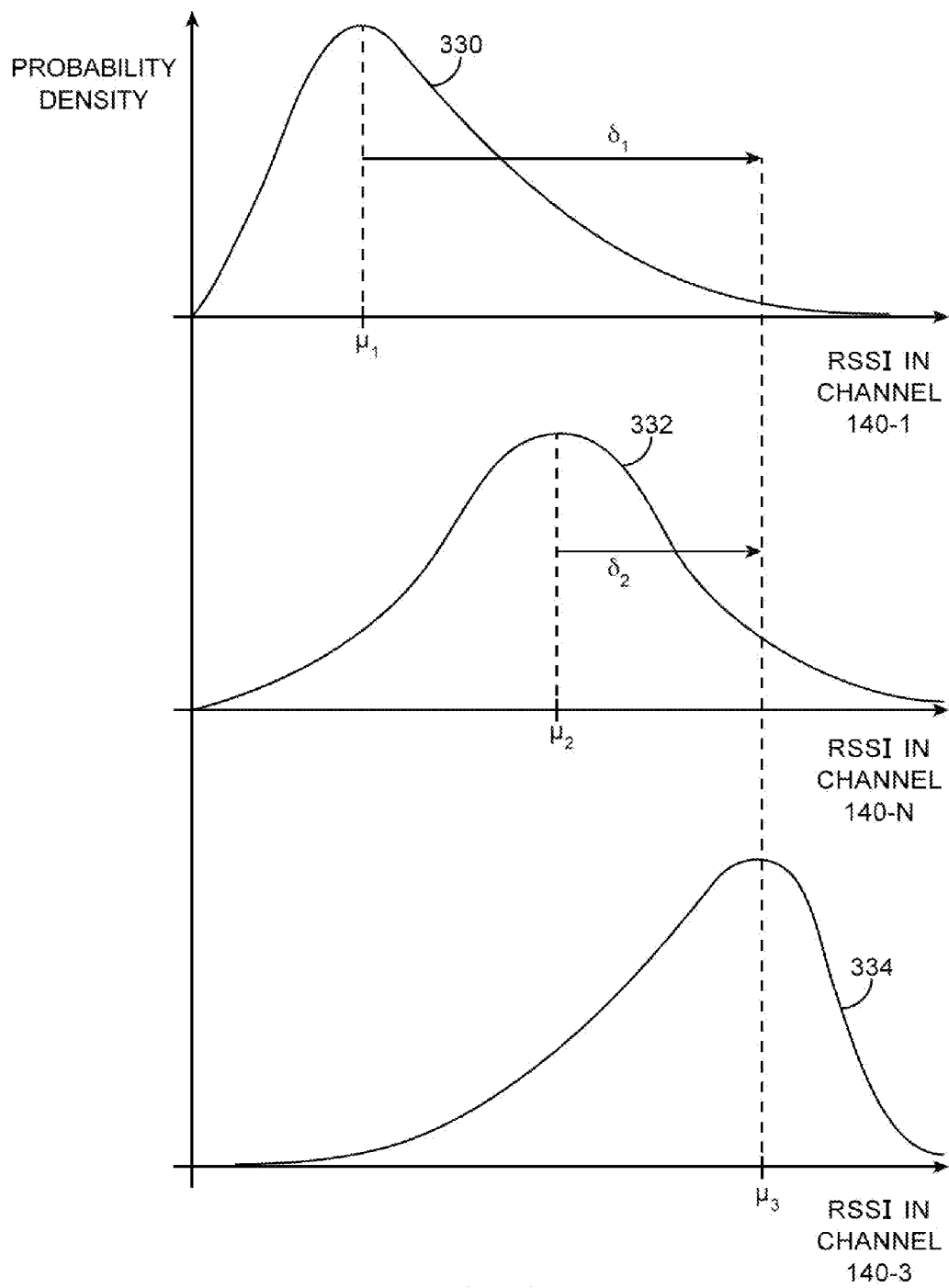
FIG. 7 is a graph showing how probability distributions of RSSI values may be accumulated by a wireless electronic device for radio-frequency signals received in different radio-frequency channels in accordance with an embodiment of the present invention.

FIG. 7 is an illustrative plot showing how probability distributions of RSSI values accumulated by storage and processing circuitry 28 may be used to generate offset RSSI values. As shown in FIG. 7, curve 330 illustrates a probability distribution of RSSI values gathered by control circuitry 62 for radio-frequency signals received in a first frequency channel such as frequency channel 140-1 of FIG. 4. Curve 332 illustrates a probability distribution of RSSI values gathered for radio-frequency signals received in a second frequency channel such as frequency channel 140-N. Curve 334 illustrates a probability distribution of RSSI values gathered for radio-frequency signals received in a third frequency channel such as frequency channel 140-3. Probability distributions 330, 332, and 334 may, for example, be accumulated by storage and processing circuitry 28 while processing steps 302-316 of FIG. 6 (e.g., by accumulating gathered RSSI values until a statistically significant number of RSSI values has been gathered for the associated frequencies).

Storage and processing circuitry may generate a set of statistics (e.g., mean values, standard deviation values, variance values, etc.) for each accumulated probability distribution. Probability distribution 330 may have a mean RSSI value $\mu_1$. In the example of FIG. 7, mean RSSI value $\mu_1$ may be equivalent to RSSI value $Y_2$ as shown in FIG. 4. RSSI values gathered for frequency channel 140-1 may be subject to a relatively large gain bias (e.g., mean RSSI value $\mu_1$ may be less than RSSI values gathered for frequency channels near the center of the communications band). Probability distribution 332 may have a mean RSSI value $\mu_2$. Mean value $\mu_2$ may, for example, be equivalent to RSSI value $Y_3$. RSSI values gathered for frequency channel 140-N may be subject to a relatively small gain bias (e.g., mean RSSI value $\mu_2$ may be less than RSSI values gathered for frequency channels having no gain bias but greater than mean RSSI value $\mu_1$ associated with frequency channel 140-1). Probability distribution 334 may have a third mean RSSI value $\mu_3$. Mean RSSI value $\mu_3$ may, for example, be equivalent to RSSI value $Y_1$.

If desired, each offset RSSI value may be computed based on the difference between the associated mean RSSI value and the largest mean RSSI value. In the example of FIG. 7, Processing circuitry 28 generates a first offset value $\delta_1$ for frequency channel 140-1 and a second offset value $\delta_2$ for frequency channel 140-2. Offset value $\delta_1$ may be computed as the difference (e.g., as a difference value) between mean RSSI values $\mu_1$ and $\mu_3$ and offset value $\delta_2$ may be computed as the difference between mean RSSI values $\mu_2$ and $\mu_3$. Offset value $\delta_1$ may be added to RSSI values that are subsequently gathered from radio-frequency signals received in frequency channel 140-1 and offset value $\delta_2$ may be added to RSSI values that are subsequently gathered from radio-frequency signals received in frequency channel 140-2 to generate calibrated RSSI values.

In the example of FIG. 7, processing circuitry 28 accumulates each probability distribution for a particular device motion value and temperature value. Curves 330, 332, and 334 may include RSSI values that were accumulated while sensor circuitry 46 measured a given motion value (e.g., a force value of 1 Newton) and a given temperature value (e.g., an internal device temperature of 25 degrees Celsius).

The example of FIG. 7 is merely illustrative. If desired, values $\mu_1$, $\mu_2$, and $\mu_3$ may be median values associated with each probability distribution or may be values that correspond to the maxima of each probability distribution (e.g., offset values $\delta_1$ and $\delta_2$ may be computed as differences between the median values of distributions 330, 332, and 334, etc.). If desired, RSSI offset values such as offset values $\delta_1$ and $\delta_2$ may be computed based on difference values between any desired combination of accumulated probability distributions. For example, offset value $\delta_1$ may be computed as the difference between mean value $\mu_1$ associated with frequency channel 140-1 and mean value $\mu_2$ associated with frequency channel 140-N, may be computed as the difference between mean value $\mu_1$ and a mean value associated with a probability distribution generated for frequency channel 140-2, may be computed as the difference between mean values $\mu_2$ and $\mu_3$, etc. In another suitable arrangement, each offset value is computed as a difference value between the mean value of the associated probability distribution and an average mean value that is computed as an average of the mean values for each probability distribution.

If desired, storage and processing circuitry 28 may perform outlier detection operations for each gathered RSSI value. For example, an RSSI threshold may be identified for each accumulated probability distribution. The RSSI threshold may, if desired, be determined based on the set of statistics associated with the accumulated probability distribution (e.g., the threshold may be computed based on a variance or standard deviation of the probability distribution).

Storage and processing circuitry 28 may compare gathered RSSI values to the RSSI threshold to determine whether a gathered RSSI value is an outlier RSSI value. If a gathered RSSI value is greater than the associated RSSI threshold, the gathered RSSI value may be identified as an outlier RSSI value. If desired, the accumulated probability distribution associated with the outlier RSSI value may be reset (e.g., an accumulated probability distribution for the frequency channel for which the outlier RSSI value was gathered may be set to zero for all RSSI values). In this way, new probability distributions may be generated if outlier RSSI values are gathered.

Figure 8:
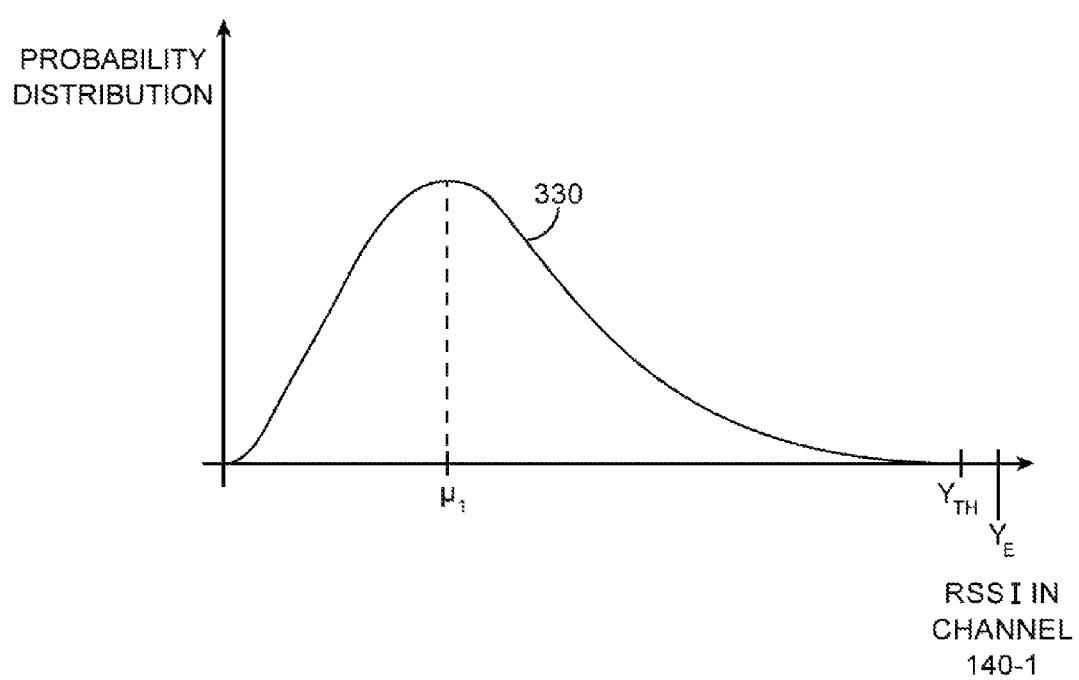
FIG. 8 is a graph showing how a gathered RSSI value may be compared to an RSSI outlier threshold for resetting an accumulated probability distribution of RSSI values associated with a particular radio-frequency channel in accordance with an embodiment of the present invention.

FIG. 8 is an illustrative plot showing how an outlier RSSI value may be identified for a particular frequency channel. As shown in FIG. 8, an outlier RSSI threshold value $Y_{TH}$ may be identified for probability distribution 330 associated with frequency channel 140-1. RSSI threshold value $Y_{TH}$ may, for example, be two standard deviations greater than mean value $\mu_1$, three standard deviations greater than mean value $\mu_1$, 1.5 standard deviations greater than mean value $\mu_1$, or any other desired value. If desired, threshold value $Y_{TH}$ may be a predetermined threshold value specified by design requirements, carrier-imposed requirements, manufacturing requirements, regulatory requirements, operator requirements, or any other suitable requirements on the wireless performance of device 10.

In another suitable arrangement, processing circuitry 28 may select threshold value $Y_{TH}$ so that a particular area under probability distribution curve 330 corresponds to RSSI values that are less than threshold value $Y_{TH}$. For example, threshold value $Y_{TH}$ may be selected so that 96% of the area under curve 330 corresponds to RSSI values that are less than threshold value $Y_{TH}$, may be selected so that 99.5% of the area under curve 330 corresponds to RSSI values that are less than threshold value $Y_{TH}$, etc.

An additional RSSI value $Y_E$ may be gathered by control circuitry 62 (e.g., while processing step 208 of FIG. 5). Storage and processing circuitry 28 may compare RSSI value $Y_E$ to RSSI threshold value $Y_{TH}$. In the example of FIG. 8, circuitry 28 may determine that additional RSSI value $Y_E$ is greater than threshold value $Y_{TH}$. Circuitry 28 may subsequently reset probability distribution 330 to zero for all RSSI values for frequency channel 140-1. In this way, circuitry 28 may generate new probability distributions of RSSI values when excessive RSSI values are gathered.

In another suitable arrangement, circuitry 28 may identify upper and lower RSSI outlier thresholds for each accumulated probability distribution. In this scenario, the upper and lower RSSI outlier thresholds may be selected so that a desired area under the associated probability distribution corresponds to RSSI values that are greater than the lower outlier threshold and less than the upper outlier threshold. For example, a lower and upper outlier threshold may be selected so that 99% of the area under the associated probability distribution is greater than the lower threshold and less than the upper threshold. If a subsequently gathered outlier value is greater than the upper outlier threshold or less than the lower outlier threshold, circuitry 28 may reset the associated probability distribution.

Storage and processing circuitry 28 may use calibration data 29 (e.g., RSSI offset values) to generate calibrated RSSI values. The calibrated RSSI values may compensate for channel-to-channel gain bias for radio-frequency signals received at wireless communications circuitry 34. If desired, the calibrated RSSI values may be used by processing circuitry 28 to determine accurate distances between device 10 and external devices 11 (e.g., to determine accurate distances to external devices 11 regardless of which frequency channel radio-frequency signals are received in).

Figure 9:
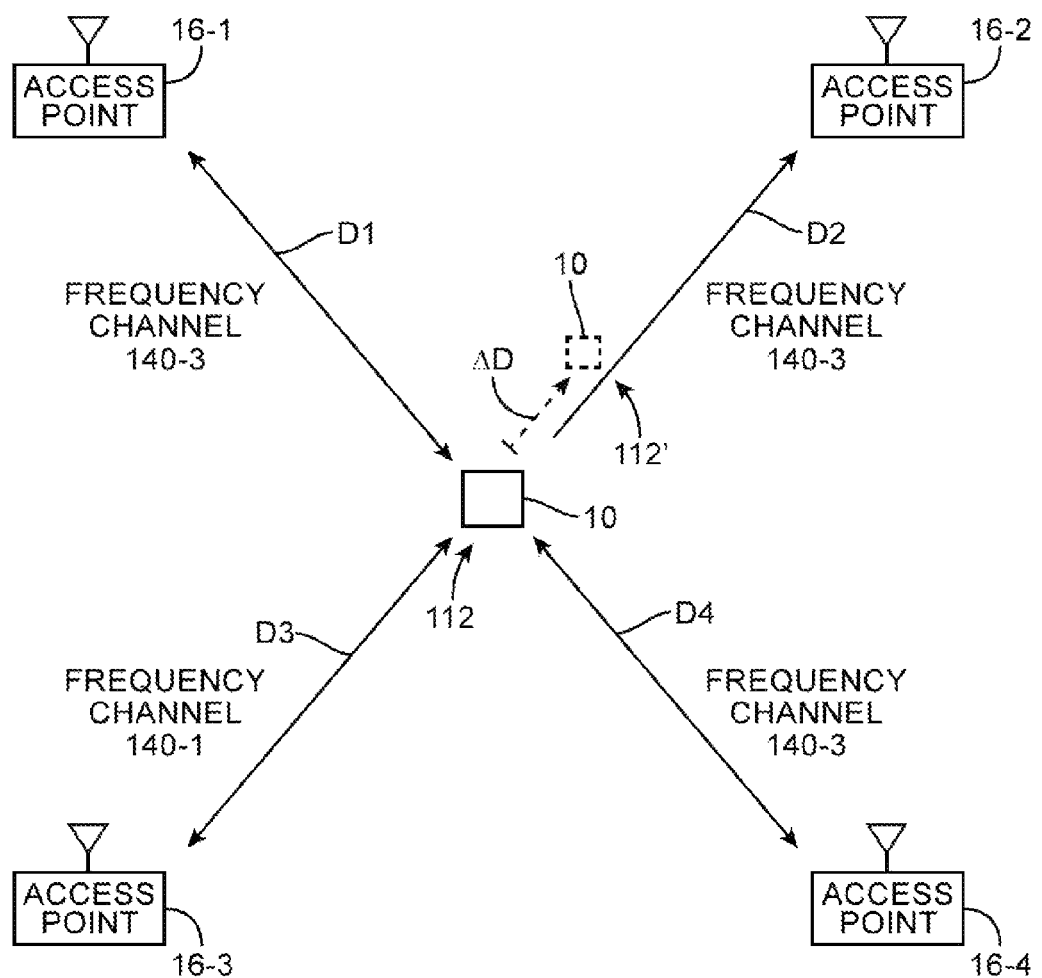
FIG. 9 is a diagram showing how a wireless electronic device in communication with external communications devices may use calibrated RSSI values to determine an accurate device location with respect to the external communications devices in accordance with an embodiment of the present invention.

FIG. 9 is an illustrative diagram showing how device 10 can determine accurate geographical location information using calibrated RSSI values. As shown in FIG. 9, device 10 may be located at a geographic location 112. Device 10 may determine its geographic location by estimating the distance between device 10 and a number of external devices 11 (e.g., based on RSSI values gathered from radio-frequency signals received from external devices 11).

In the example of FIG. 9, device 10 receives radio-frequency signals from a first WLAN access point 16-1, from a second WLAN access point 16-2, from a third WLAN access point 16-2, and from a fourth WLAN access point 16-4. First access point 16-1 may be located at a distance D1 from device 10, second access point 16-2 may be located at a distance D2 from device 10, third access point 16-3 may be located at a distance D3 from device 10, and fourth access point 16-4 may be located at a distance D4 from device 10.

Device 10 may receive radio-frequency signals from access points 16 in a communications band such as the communications band between frequencies $F_L$ and $F_M$ as shown in FIG. 4 (e.g., in a WiFi® communications band). In the example of FIG. 9, device 10 receives radio-frequency signals in frequency channel 140-3 from access points 16-1, 16-2, and 16-4 (e.g., device 10 may receive radio-frequency signals from each access point simultaneously or from a single access point at a time). Device 10 may receive radio-frequency signals in frequency channel 140-1 from access point 16-3.

Device 10 may gather RSSI values from the radio-frequency signals received from access points 16. Wireless communications circuitry 34 may have channel-to-channel gain bias that causes signals to be passed to baseband processing circuitry 58 with different gains at different signal frequencies. For example, control circuitry 62 in device 10 may gather RSSI values $Y_1$ from access points 16-1, 16-2, and 16-4 (e.g., as shown by point 102-3 of FIG. 4) and may gather an erroneously low RSSI value $Y_2$ from access point 16-3 (e.g., as shown by point 102-1 of FIG. 4).

Storage and processing circuitry 28 may process the gathered RSSI values to determine the distance between each access point 16 and device 10. Processing circuitry 28 may combine the distances between device 10 and each access point 16 to determine a location for device 10. Processing circuitry 28 may correctly determine that device 10 is a distance D1 from first access point 16-1, a distance D2 from access point 16-2, and a distance D4 from access point 16-4 (e.g., based on a correlation between RSSI values and distance such as curve 104 of FIG. 3).

Processing circuitry 28 may incorrectly determine that device 10 is located at a distance ΔD farther than distance D3 from access point 16-3 (e.g., because RSSI value $Y_2$ gathered for access point 16-3 in frequency channel 140-1 is less than an RSSI value $Y_1$ that would be gathered in frequency channel 140-1 if no gain bias were present). When combining the determined distance between each access point 16 and device 10, processing circuitry 28 may erroneously determine that device 10 is at a location 112' that is a distance ΔD farther from access point 16-3 than the actual location 112 of device 10.

Processing circuitry 28 may accumulate probability distributions for RSSI values gathered from each access point 16. For example, circuitry 28 may accumulate probability distribution 334 as shown by FIG. 7 using RSSI values associated with signals received from access points 16-1, 16-2, and 16-4 and may accumulate probability distribution 334 using RSSI values gathered associated with signals received from access point 16-3. Processing circuitry 28 may compute an offset RSSI value for radio-frequency signals received in frequency channel 140-1 based on the probability distributions of gathered RSSI values. In the example of FIG. 9, processing circuitry 28 may compute an offset value $\delta_1$ for RSSI values gathered from radio-frequency signals received from access point 16-3.

Storage and processing circuitry 28 may apply offset value $\delta_1$ to subsequently gathered RSSI values from access point 16-3 to generate calibrated RSSI values. Circuitry 28 may correctly determine that device 10 is located at distance D3 from access point 16-3 using the calibrated RSSI values. Processing circuitry 28 may subsequently determine that device 10 is at actual geographic location 112.

The example of FIG. 9 is merely illustrative. If desired, any external devices 11 such as satellites 12, Bluetooth® devices 15, or cellular base stations 14 may be used to determine the geographical location of device 10. Any number of external devices 11 may be used (e.g., two access points 16, three satellites 12, four satellites 12, five Bluetooth® devices 15, etc.).

Figure 10:
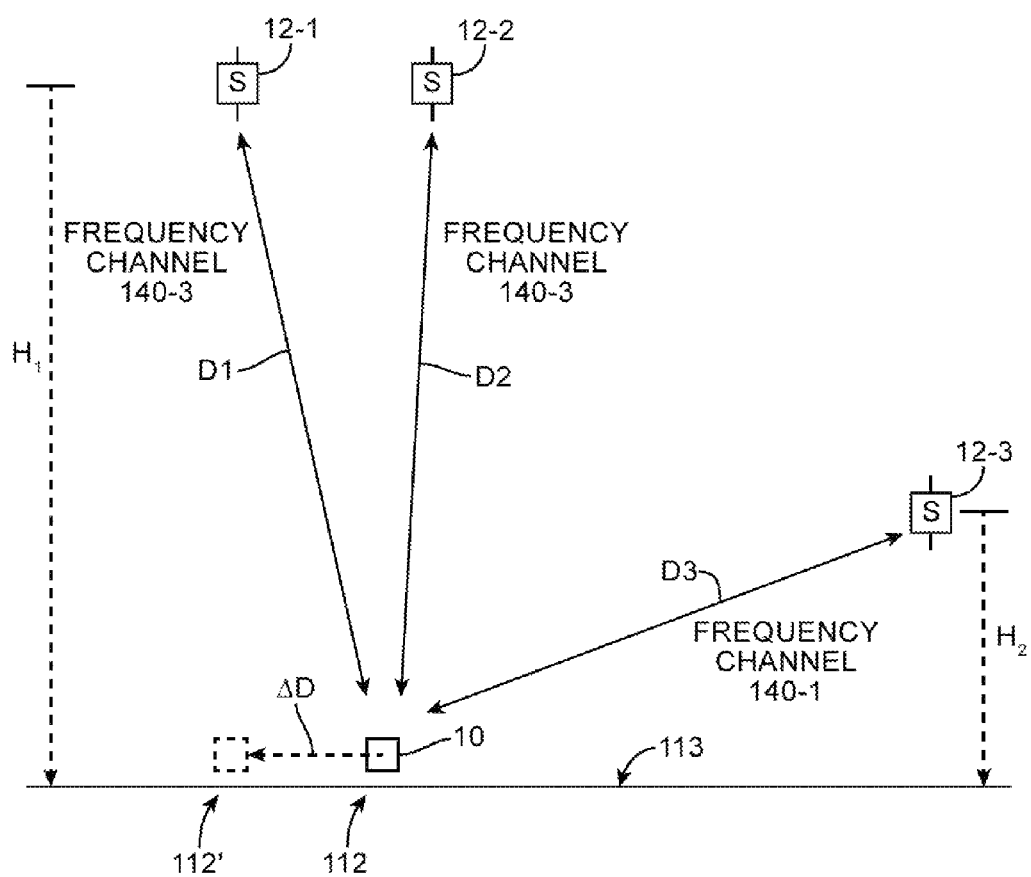
FIG. 10 is a diagram showing how a wireless electronic device in communication with multiple geo-location satellites may use calibrated RSSI values and a satellite elevation mask to determine an accurate device location in accordance with an embodiment of the present invention.

FIG. 10 is an illustrative diagram showing how storage and processing circuitry 28 may determine an accurate geographical location of device 10 using calibrated RSSI values gathered from radio-frequency signals received from satellites 12 (e.g., a first geo-location satellite 12-1, a second geo-location satellite 12-2, and a third geo-location satellite 12-3). As shown in FIG. 10, device 10 may be located at a geographical location 112 at ground level 113.

In the example of FIG. 10, device 10 receives radio-frequency signals from satellites 12-1, 12-2, and 12-3. Satellite 12-1 may be located at a distance D1 from device 10, satellite 12-2 may be located at a distance D2 from device 10, and satellite 12-3 may be located at a distance D3 from device 10. Satellites 12-1 and 12-2 may be located at a height $H_1$ above ground level 113. Satellite 12-3 may be located at a height H$_2$ above ground level 113 (e.g., satellite 12-3 may be in a lower earth-orbit than satellites 12-1 and 12-2).

In the example of FIG. 10, device 10 receives radio-frequency signals in frequency channel 140-3 from satellites 12-1 and 12-2 and in frequency channel 140-1 from satellite 12-3. Control circuitry 62 may gather RSSI values Y$_1$ from satellites 12-1 and 12-2 (e.g., as shown by point 102-3 of FIG. 4) and may gather an erroneously low RSSI value Y$_2$ from satellite 12-3 (e.g., as shown by point 102-1 of FIG. 4).

Storage and processing circuitry 28 may process the gathered RSSI values to determine the distance between each satellite 12 and device 10. Processing circuitry 28 may combine the distances between device 10 and each satellite 12 to determine a geographic location for device 10. Processing circuitry 28 may incorrectly determine that device 10 is at a location 112' that is a distance ΔD from the actual location 112 of device 10 (e.g., because of the erroneously low RSSI values gathered for satellite 12-3).

If desired, storage and processing circuitry 28 may apply an elevation mask to the RSSI values gathered from each satellite 12 to compensate for the difference between elevations H$_1$ and H$_2$ of satellites 12 and to compensate for atmospheric absorption of signals received from satellites 12. For example, radio-frequency signals received from satellite 12-3 may be subject to greater atmospheric absorption than radio-frequency signals received from satellites 12-1 and 12-2 (e.g., because there is more atmosphere between device 10 and satellite 12-3 than between device 10 and satellites 12-1 and 12-2). Processing circuitry 28 may apply an elevation mask to RSSI values received from satellite 12-3 to compensate for the atmospheric absorption of radio-frequency signals received from satellite 12-3.

If desired, storage and processing circuitry 28 may use the calibrated RSSI values to determine a frequency channel in which to communicate with external devices 11. For example, processing circuitry 28 may select a frequency channel having low gain bias (e.g., channel 140-3 of FIG. 4) for communication operations with external devices 11. In this way, processing circuitry 28 may avoid communication operations in frequency channels associated with erroneous RSSI values. Display 44 on device 10 (see FIG. 1) may display accurate signal strength indicators (e.g., graphical signal bars) based on the calibrated RSSI values regardless of the receive frequency channel from which the RSSI values are gathered. If desired, storage and processing circuitry 28 may compute accurate link quality estimates and/or accurate signal power level measurements using the calibrated RSSI values.

Processing circuitry 28 may generate calibrated RSSI values during normal operation of device 10 (e.g., during operation of device 10 by an end user). In this way, storage and processing circuitry 28 may perform so-called "field calibration" (sometimes referred to as "on-the-fly calibration") of RSSI values gathered from received radio-frequency signals. In another suitable arrangement, processing circuitry 28 may generate calibrated RSSI values in a factory setting (e.g., in a test system having test stations and test hosts, a manufacturing system, a calibration system, etc.).

The example of FIGS. 3-10 in which gathered RSSI values are calibrated is merely illustrative. In general, data associated with any desired receive signal quality metric may be gathered and accumulated from received radio-frequency signals and may be used for generating calibration data 29. For example, calibration data 29 may include calibrated received signal code power data, calibrated signal-to-interference ratio data, calibrated signal-to-noise ratio data, etc.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating a wireless electronic device having wireless communications circuitry and processing circuitry, the method comprising:
   with the wireless communications circuitry, receiving radio-frequency signals in first and second radio-frequency channels;
   with the processing circuitry, gathering receive signal quality data for the received radio-frequency signals in the first and second radio-frequency channels; and
   with the processing circuitry, comparing the receive signal quality data gathered from the radio-frequency signals in the first radio-frequency channel to the receive signal quality data gathered from the radio-frequency signals in the second radio-frequency channel, wherein comparing the receive signal quality data comprises obtaining a receive signal quality offset value for the received radio-frequency signals in the first radio-frequency channel; and
   with the processing circuitry, compensating for channel-to-channel gain bias associated with the wireless communications circuitry by modifying the receive signal quality data for the received radio-frequency signals in the first radio-frequency channel using the receive signal quality offset value.

2. The method defined in claim 1, wherein gathering the receive signal quality data comprises:
   gathering received signal strength indicator (RSSI) values for the received radio-frequency signals in the first and second radio-frequency channels.

3. The method defined in claim 2, wherein gathering the RSSI values comprises:
   accumulating a probability distribution of RSSI values for the received radio-frequency signals in the first radio-frequency channel.

4. The method defined in claim 3, further comprising:
   with the processing circuitry, identifying an RSSI outlier threshold associated with the accumulated probability distribution of RSSI values; and
   with the processing circuitry, comparing a given RSSI value to the outlier threshold.

5. The method defined in claim 4, further comprising:
   in response to determining that the given RSSI value is greater than the RSSI outlier threshold, resetting the gathered probability distribution of RSSI values.

6. The method defined in claim 3, wherein gathering the RSSI values further comprises:
   accumulating an additional probability distribution of RSSI values for the received radio-frequency signals in the second radio-frequency channel.

7. The method defined in claim 6, wherein comparing the receive signal quality data comprises:
   determining a difference value between the first and second probability distributions of RSSI values.

8. The method defined in claim 7, further comprising:
   with the processing circuitry, adding the difference value to the gathered RSSI values for the received radio-frequency signals in the first frequency channel.

9. The method defined in claim 1, further comprising:
   with the processing circuitry, estimating a location of the wireless electronic device using the modified receive signal quality data.

10. The method defined in claim 1, further comprising:
    with the processing circuitry, identifying a location of the wireless electronic device using the modified receive signal quality data.

11. The method defined in claim 1, further comprising:
with the processing circuitry, accumulating a probability distribution of the receive signal quality data in the first radio-frequency channel.

12. The method defined in claim 11, further comprising:
with the processing circuitry, accumulating an additional probability distribution of the receive signal quality data in the second radio-frequency channel.

13. The method defined in claim 12, further comprising:
with the processing circuitry, generating an offset value by comparing the probability distribution to the additional probability distribution; and
with the processing circuitry, modifying the receive signal quality data in one of the first and second radio-frequency channels using the generated offset value.

14. The method defined in claim 13, further comprising:
with the processing circuitry, detecting changes in an operating state of the wireless electronic device; and
in response to detecting the changes in the operating state of the wireless electronic device, updating the offset value using the processing circuitry.

15. The method defined in claim 14, wherein the wireless electronic device comprises temperature sensor circuitry, and detecting changes in the operating state of the wireless electronic device comprises:
detecting a change in device temperature using temperature data generated by the temperature sensor circuitry.

16. The method defined in claim 14, wherein the wireless electronic device comprises motion sensor circuitry, and detecting changes in the operating state of the wireless electronic device comprises:
detecting a change in device motion using motion data generated by the motion sensor circuitry.

17. A method for operating a wireless electronic device having wireless communications circuitry and processing circuitry, the method comprising:
with the wireless communications circuitry, receiving radio-frequency signals in first and second radio-frequency channels;
with the processing circuitry, gathering receive signal quality data for the received radio-frequency signals in the first and second radio-frequency channels; and
with the processing circuitry, generating an offset value by comparing the receive signal quality data gathered from the radio-frequency signals in the first radio-frequency channel to the receive signal quality data gathered from the radio-frequency signals in the second radio-frequency channel;
with the processing circuitry, detecting changes in an operating state of the wireless electronic device; and
in response to detecting the changes in the operating state of the wireless electronic device, updating the offset value using the processing circuitry, wherein updating the offset value comprises:
accumulating a first probability distribution of the receive signal quality data in the first radio-frequency channel;
accumulating a second probability distribution of the receive signal quality data in the second radio-frequency channel;
generating an updated offset value by comparing the first and second probability distributions; and
modifying the receive signal quality data in one of the first and second radio-frequency channels using the updated offset value.

18. A method for operating a wireless electronic device having wireless communications circuitry and processing circuitry, the method comprising:
with the wireless communications circuitry, receiving radio-frequency signals in first and second radio-frequency channels;
with the processing circuitry, gathering receive signal quality data for the received radio-frequency signals in the first and second radio-frequency channels; and
with the processing circuitry, comparing the receive signal quality data gathered from the radio-frequency signals in the first radio-frequency channel to the receive signal quality data gathered from the radio-frequency signals in the second radio-frequency channel;
with the processing circuitry, accumulating a probability distribution of the receive signal quality data in the first radio-frequency channel;
with the processing circuitry, accumulating an additional probability distribution of the receive signal quality data in the second radio-frequency channel;
with the processing circuitry, generating an offset value by comparing the probability distribution to the additional probability distribution;
with the processing circuitry, modifying the receive signal quality data in one of the first and second radio-frequency channels using the generated offset value;
with the processing circuitry, detecting changes in an operating state of the wireless electronic device; and
in response to detecting the changes in the operating state of the wireless electronic device, updating the offset value using the processing circuitry, wherein updating the offset value comprises:
accumulating an updated probability distribution of the receive signal quality data in the first radio-frequency channel;
accumulating an additional updated probability distribution of the receive signal quality data in the second radio-frequency channel;
generating an updated offset value by comparing the updated probability distribution to the additional updated probability distribution; and
modifying the receive signal quality data in one of the first and second radio-frequency channels using the updated offset value.

* * * * *